(12) United States Patent
Van Ness et al.

(10) Patent No.: US 7,739,192 B2
(45) Date of Patent: Jun. 15, 2010

(54) AUTOMATED ACCOUNTING FOR BUSINESS REPLY MAIL

(75) Inventors: George L. Van Ness, Fredericksburg, VA (US); Wanda E. Young, Stafford, VA (US)

(73) Assignee: Uniited States Postal Service, Washington, DC (US)

( * ) Notice: Subject to any disclaimer, the term of this patent is extended or adjusted under 35 U.S.C. 154(b) by 0 days.

(21) Appl. No.: 10/240,164

(22) PCT Filed: Jan. 31, 2002

(86) PCT No.: PCT/US02/02619

§ 371 (c)(1),
(2), (4) Date: Mar. 19, 2003

(87) PCT Pub. No.: WO02/006199

PCT Pub. Date: Aug. 8, 2002

(65) Prior Publication Data

US 2003/0163421 A1    Aug. 28, 2003

Related U.S. Application Data

(60) Provisional application No. 60/265,087, filed on Jan. 31, 2001.

(51) Int. Cl.
*G06Q 40/00* (2006.01)
(52) U.S. Cl. ........................................................ 705/40
(58) Field of Classification Search ................ 705/1, 705/401, 402, 404, 408
See application file for complete search history.

(56) References Cited

U.S. PATENT DOCUMENTS

| | | | | |
|---|---|---|---|---|
| 2,107,450 A | * | 2/1938 | Miller | 229/92.8 |
| 2,689,082 A | * | 9/1954 | Kolisch | 705/414 |
| 4,499,545 A | * | 2/1985 | Daniels et al. | 705/402 |
| 5,165,726 A | * | 11/1992 | Talbott | 283/81 |
| 5,408,416 A | * | 4/1995 | Gilham | 705/406 |
| 5,415,341 A | * | 5/1995 | Diamond | 229/80 |
| 5,612,889 A | * | 3/1997 | Pintsov et al. | 364/478.14 |

(Continued)

FOREIGN PATENT DOCUMENTS

EP    1 063 602 A1    12/2000

(Continued)

OTHER PUBLICATIONS

"Services available from the U.S. Postal Service": Profit-Building Strategies for Business Owners, Mar. 1989, vol. 19, No. 3, p. 8.*

(Continued)

*Primary Examiner*—John W Hayes
*Assistant Examiner*—Rob Wu
(74) *Attorney, Agent, or Firm*—Lewis and Roca LLP

(57) ABSTRACT

Methods and systems are provided for automating an accounting process for business reply mail (BRM). The process may enable a mailer to create a BRM mailpiece marked with a unique code, which is provided to a responder. The responder may send the BRM mailpiece to the mailer without adding postage to the BRM mailpiece. A service provider may read the bar code to determine the mailer, deliver the BRM mailpiece to the mailer, and then bill the mailer for the postage.

31 Claims, 5 Drawing Sheets

U.S. PATENT DOCUMENTS

| | | | |
|---|---|---|---|
| 5,713,511 A * | 2/1998 | Diamond | 229/302 |
| 5,842,693 A | 12/1998 | Stevens et al. | |
| 6,226,626 B1 * | 5/2001 | Thiel | 705/407 |
| 6,385,504 B1 | 5/2002 | Pintov et al. | |
| 6,459,953 B1 | 10/2002 | Connelly et al. | |
| 7,225,170 B1 * | 5/2007 | Ryan, Jr. | 705/401 |
| 2002/0046196 A1 * | 4/2002 | Ogg | 705/406 |
| 2002/0073040 A1 | 6/2002 | Schwartz et al. | |
| 2002/0143430 A1 | 10/2002 | Sansone et al. | |
| 2003/0135627 A1 * | 7/2003 | Hussain | 709/228 |

FOREIGN PATENT DOCUMENTS

WO    WO 02/11073 A1    7/2002

OTHER PUBLICATIONS

Spotlite: Denver Rocky Mountain News, p. 2D, (Dec. 21, 1998).*
Spotlite,: Denver Rocky Mountain News, p. 2D, (Dec. 21, 1998).
USPS™ Publication 40, Address Information Systems Products and Services, Feb. 1999.
USPS™ Publication 25, Designing Letter and Reply Mail, Chapter 4, POSTNET™ Barcodes, Jul. 2003.
USPS™ POSTNET™ Barcode Certification User Guide (POSTNET), Aug. 1997.
USPS™ Publication 432, CONFIRM™: Mail Tracking Information Using PLANETCode™, Mar. 2001.
Examiner's Report, Australian Patent Office, Oct. 20, 2005 (2 pages).
First Notification of Office Action from the Chinese Patent Office, May 13, 2005.

\* cited by examiner

AUTOMATED ACCOUNTING FOR BUSINESS REPLY MAIL

CROSS REFERENCE TO RELATED APPLICATIONS

This application claims the benefit of U.S. Provisional Patent Application No. 60/265,087, entitled "AUTOMATED ACCOUNTING FOR BUSINESS REPLY MAIL" and filed on Jan. 31, 2001, the entire contents of which are expressly incorporated herein by reference.

DESCRIPTION OF THE INVENTION

1. Field of the Invention

The present invention relates to systems and methods for automated accounting for transportation of documents.

2. Background of the Invention

Mailers may use Business Reply Mail (BRM) to facilitate their customers sending mailpieces to them. For example, BRM mailpieces typically include postcards, one-ounce letter envelopes, and two-ounce letter envelopes. BRM mailpieces may be distributed to the mailer's customers in various ways. For example, the BRM mailpiece may be inserted in a magazine or provided with another piece of mail. Then the customer may respond using the BRM, for example, to request information, to place an order for goods or services, or to provide information to the mailer.

However, each of the three conventional BRM schemes have significant disadvantages. In the first scheme, mailers may provide BRM mailpieces to their customers and require that the customers pay for postage. However, requiring the customers to pay for postage may significantly reduce the probability that the customers will respond.

In the second scheme, mailers may provide BRM mailpieces to their customers and agree to pay-on-delivery (POD) charges for each mailpiece when it is received. However, mailers may then incur significantly higher service fees including, for example, first-class service fees and service charges for POD processing for each mailpiece.

In the third scheme, the mailer may qualify for discounted service fees, for example, by pre-paying postage for each mailpiece before providing it to the mailer's customer. A service provider (SP) such as the United States Postal Service (USPS™), Federal Express (FEDEX™), or United Parcel Service (UPS™) may offer discounted service fees to mailers based, in part, on a volume of service provided. For example, the SP may offer discounted service fees to a mailer who sends thousands of pieces of mail if the mailer follows certain procedures, such as, for example, conforming the delivery addresses to a format specified in USPS™ Publication 40, Address Information Systems: Products and Services (PUB 40). However, if the customer does not return the mailpiece, then the mailer pays for services that are not actually used.

SUMMARY OF THE INVENTION

Systems and methods consistent with the present invention may reduce a mailer's costs for BRM service through increased use of automation.

A method consistent with the present invention may provide for automating an accounting process for business reply mail (BRM), comprising the steps of: enabling a mailer to create a BRM mailpiece marked with a unique code; receiving the BRM mailpiece from a responder, wherein the responder did not apply postage to the BRM mailpiece; delivering the BRM mailpiece to the mailer; and billing the mailer for the postage due for the delivery of the BRM mailpiece to the mailer.

Another method consistent with the present invention may provide for automated billing for delivery of a mailpiece, the method comprising: enabling a mailer to mark the mailpiece with information identifying the mailer; receiving the mailpiece from a responder; identifying the mailer using the marked mailpiece; providing the marked mailpiece to a service provider for delivery; and billing the identified mailer for delivery of the mailpiece.

A system consistent with the present invention may provide for automating an accounting process for business reply mail, the system comprising: means for enabling a mailer to mark a mailpiece with information identifying the mailer; means for receiving the mailpiece from a responder; means for identifying the mailer using the marked mailpiece; means for providing the marked mailpiece to a service provider for delivery; and means for billing the identified mailer for delivery of the mailpiece.

A computer program product, consistent with yet another aspect of the present invention, comprising a computer readable medium having computer program code embodied in said medium, may provide for automated billing for delivery of a mailpiece, wherein the program code comprises: code for enabling a mailer to mark the mailpiece with information identifying the mailer; code for receiving the mailpiece from a responder; code for identifying the mailer using the marked mailpiece; code for providing the marked mailpiece to a service provider for delivery; and code for billing the identified mailer for delivery of the mailpiece.

Additional aspects of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings are included to provide a further understanding of the invention, are incorporated in and constitute a part of this specification, illustrate preferred embodiments of the invention, and together with the description, serve to explain the principles of the invention.

In the drawings.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts. Although the system set forth herein is described with respect to the USPS™, the system and methods described are not limited to the USPS™ but may be used with other service providers (SP).

Figure 1:
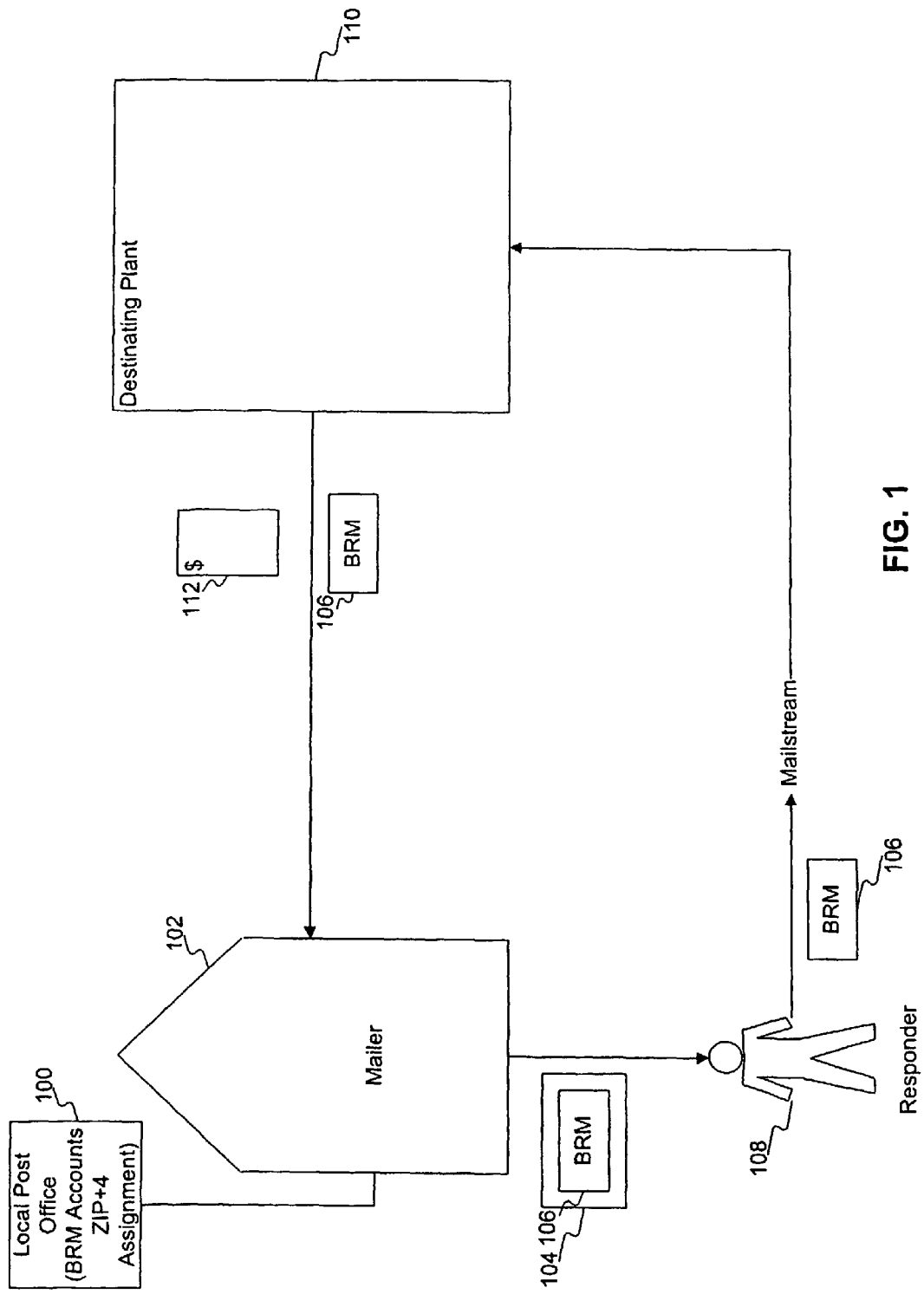
FIG. 1 is a block diagram of an exemplary model for transporting a document between a mailer and a responder in which systems and methods consistent with the present invention may be implemented.

FIG. 1 is a block diagram of an exemplary model for transporting a document between a mailer and a responder in which systems and methods consistent with the present invention may be implemented. A mailer 102 may interact with a SP such as, for example, Post Office 100 to open a business reply mail (BRM) permit account. For example, mailer 102 can pay a fee and complete an application. Then the SP may assign a unique identifier to the mailer 102 such as, for example, a unique BRM ZIP+4 code. The mailer 102 may then create and distribute a BRM mailpiece 106. For example, the mailpiece 106 may be placed inside of an envelope 104 and mailed to the responder 108. For another example, the mailpiece 106 may be inserted into a magazine. Mailpieces 106 consistent with the present invention may include, for example, postcards, one-ounce envelopes, and two-ounce envelopes.

However it is distributed, the mailpiece 106 is received by the responder 108. Then the responder 108 may use the mailpiece 106, for example, to provide information, to request information, or to request goods or services. The responder 108 may provide the mailpiece 106 to the SP, then the SP may send the mailpiece 106 to a destinating plant 110 for processing. The destinating plant may identify the mailer 102, and then forward the mailpiece 106 and accounting data 112 to the mailer 102.

Figure 2:
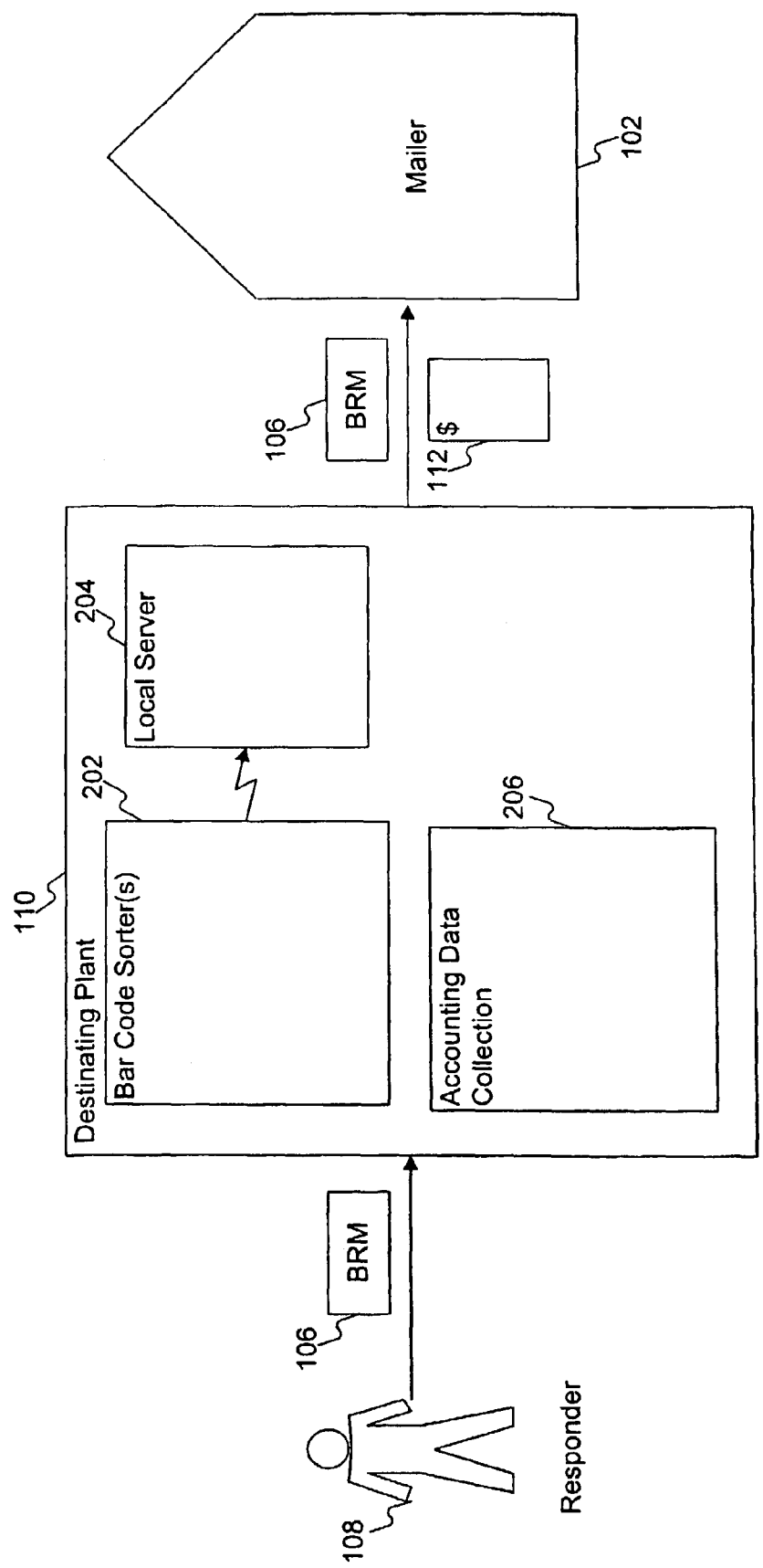
FIG. 2 is a block diagram of an exemplary destinating plant in accordance with methods and systems consistent with the present invention.

FIG. 2 is a block diagram of an exemplary destinating plant 110 in accordance with methods and systems consistent with the present invention. The destinating plant 110 may use one or more bar code sorters 202 to read information that identifies the mailer 102 on the mailpiece 106. The mailer 102 may mark their mailpieces 106 with information such as, for example, a POSTNET™ bar code that identifies the mailer 102. Detailed information regarding the POSTNET™ bar code system is disclosed, for example, in USPS™ Publication 25, Designing Letter and Reply Mail, Chapter 4, POSTNET™ Barcodes (PUB 25), the entire contents of which are incorporated herein by reference, and in the USPS™ POSTNET™ Barcode Certification Technical Guide (POSTNET), the entire contents of which are incorporated herein by reference. An automatic debit processor 308 included in a local server 204 may be used to determine a payment account corresponding to the identified mailer 102. Information regarding fees for delivering the mailpiece 106 may be gathered in a database such as, for example, accounting data collection 206. The accounting data collection 206 that is gathered may include an account number for the identified mailer 102, a number of mailpieces 106 processed for the mailer 102, and a fee corresponding to delivering the mailpieces 106. The destinating plant 110 may use information from the accounting data collection 206 to bill the mailer 102.

The local server 204 may include software that provides a reporting function 306 such as, for example, reporting to the mailer 102 that the responder 108 has sent the mailpiece 106. For example, a mailer 102 may send a bill to a responder 108 along with a BRM mailpiece 106, such as an envelope for enclosing a payment check. When the destinating plant 110 processes the mailpiece 106, the local server 204 may inform the mailer 102 that the mailpiece 106 is en route to the mailer 102, which assists the mailer 102 in estimating when the payment check will arrive. The local server 304 may also include software that automatically processes fees for delivery such as, for example, by automatically applying debits to a payment account for the mailer 102 by using automatic debit processor 308.

Figure 3:
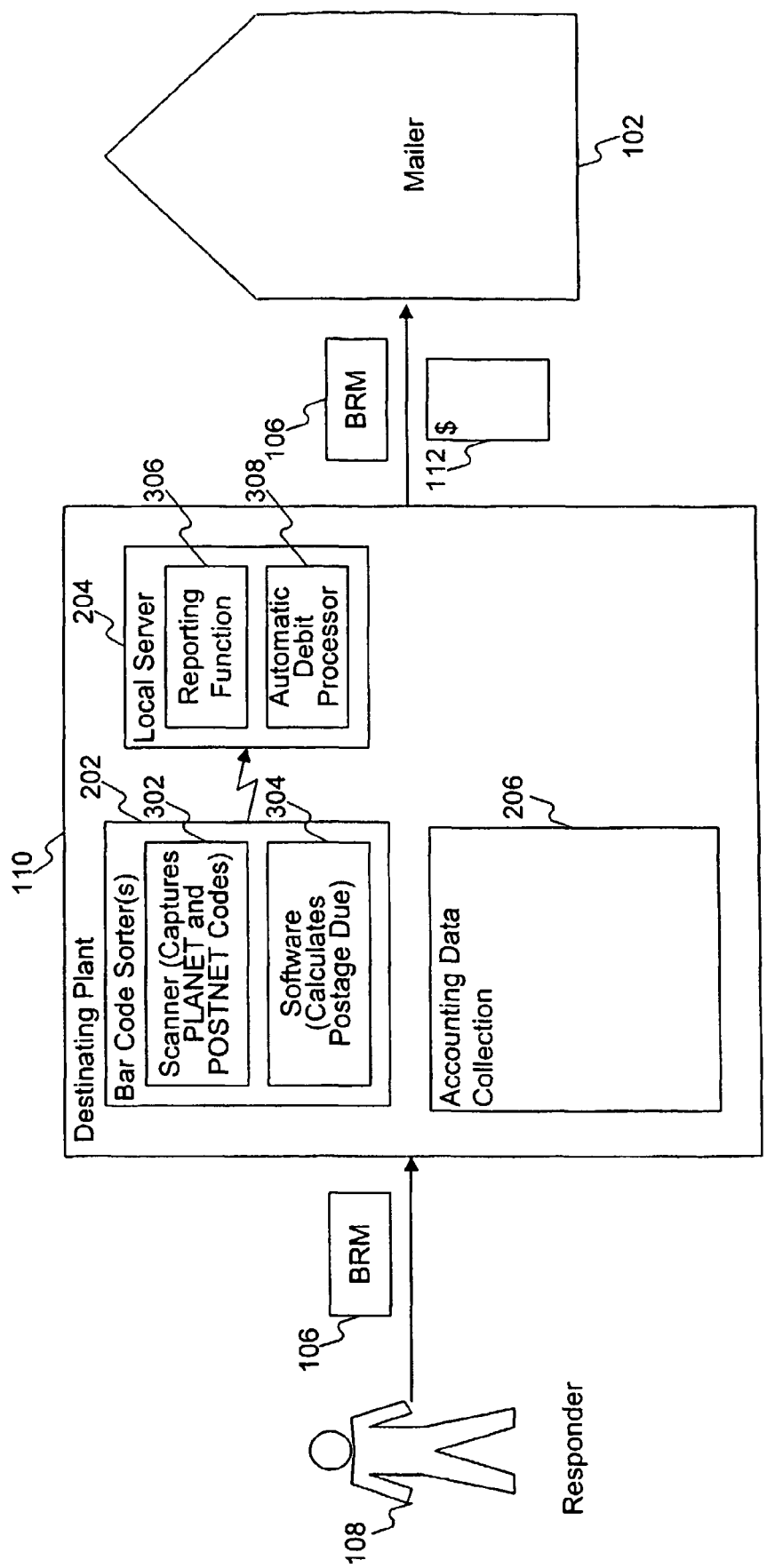
FIG. 3 is a block diagram showing further details of an exemplary destinating plant in accordance with methods and systems consistent with the present invention.

FIG. 3 is a block diagram showing further details of an exemplary destinating plant 110 in accordance with methods and systems consistent with the present invention. Each bar code sorter 202 may include a scanner 302 that scans the information identifying the mailer 102 from the mailpiece 106. For example, the scanner 302 may read a POSTNET™ bar code (e.g. a ZIP+4 code and a PLANET™ code which uniquely identifies the mailer 102. Detailed information regarding the PLANET™ bar code system is disclosed, for example, in USPS™ Publication 432, CONFIRM™: Mail Tracking Information Using PLANET Code™ (PUB 432), the entire contents of which are incorporated herein by reference. Each bar code sorter 202 may also include software 304 programmed to calculate a delivery fee. For example, the software 304 may calculate the delivery fee for transporting the mailpiece 106 from the responder 108 to the mailer 102 based on information including the identity of the mailer 102 that is provided by the PLANET™ bar code and the location of the mailer 102 that is provided by the POSTNET™ bar code.

Figure 4:
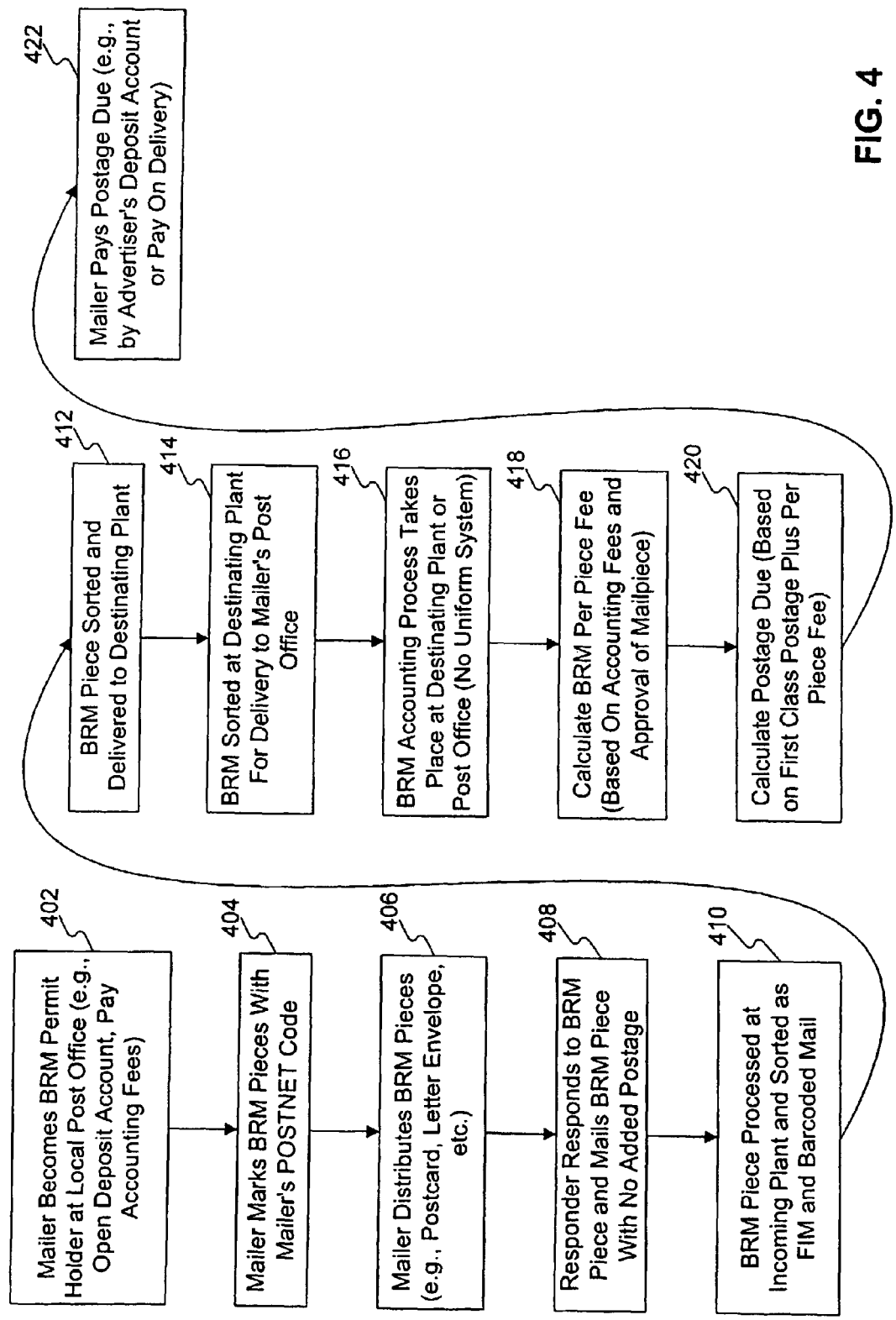
FIG. 4 is a flow chart of an exemplary scheme for transporting a document between a mailer and a responder in accordance with methods and systems consistent with the present invention.

FIG. 4 is a flow chart of an exemplary scheme for transporting a document between a mailer and a responder in accordance with methods and systems consistent with the present invention. First, a mailer 102 may obtain a BRM permit, for example, by going to a SP such as a Post Office, filling out an application, paying a permit fee, and paying an accounting fee (step 402). The accounting fee may be based on an anticipated volume of service to be provided. For example, if the mailer 102 expects to send a certain number of mailpieces 106, then the mailer 102 may pay an accounting fee to reduce the fee assessed per each mailpiece 106 sent to the mailer 102. The mailer 102 may then create BRM mailpieces 106 by marking each mailpiece 106 with information that identifies the mailer 102 such as, for example, the mailer's POSTNET™ bar code which indicates where the mailpiece 106 should be delivered (step 404). The mailer 102 may then distribute the mailpieces 106 as described above (step 406) and a responder 108 may return the mailpiece 106 by placing it in the mailstream without adding additional postage (step 408).

When the mailpiece 106 is processed by a SP, it may be sorted in accordance with the information identifying the mailer 102 (step 410). For example, the SP may automatically sort the mailpiece 106 as bar coded mail using a facing identification mark (FIM) such as the mailer's POSTNET™ bar code or the PLANET™ bar code. The mailpiece 106 may then be delivered to a destinating plant 110 (step 412). At the destinating plant 110, the mailpiece 106 may be delivered to a service window for pickup by the mailer 102, or sorted for delivery and provided to a SP for delivery to the mailer 102 (step 414).

The BRM accounting process may occur, for example, at the destinating plant 110 or at a facility of the SP such as, for example, a local Post Office (step 416). Traditionally, the accounting process may be performed manually, or manually in conjunction with some automated process. A fee per mailpiece 106 may be calculated based on whether the mailer 102 has paid accounting fees, and whether the mailer 102 followed certain procedures, such as, for example, having the mailpiece 106 pre-approved by the SP (step 418). The fee may be calculated, for example, based on First Class postage for the type of mailpiece 106 and the fee per mailpiece 106 (step 420). For another example, the fee calculation may consider whether the mailer 102 has paid accounting fees and qualified for a discounted service fee. Once the fee is calculated, the mailer 102 may pay the appropriate fee by paying-on-delivery (step 422). For example, the mailer 102 may establish and fund an advanced deposit account, then the calculated fee may be manually deducted from the deposit account. For another example, the mailpieces 106 may be provided to a SP who collects the fee for delivering the mailpieces 106 to the mailer 102.

Figure 5:
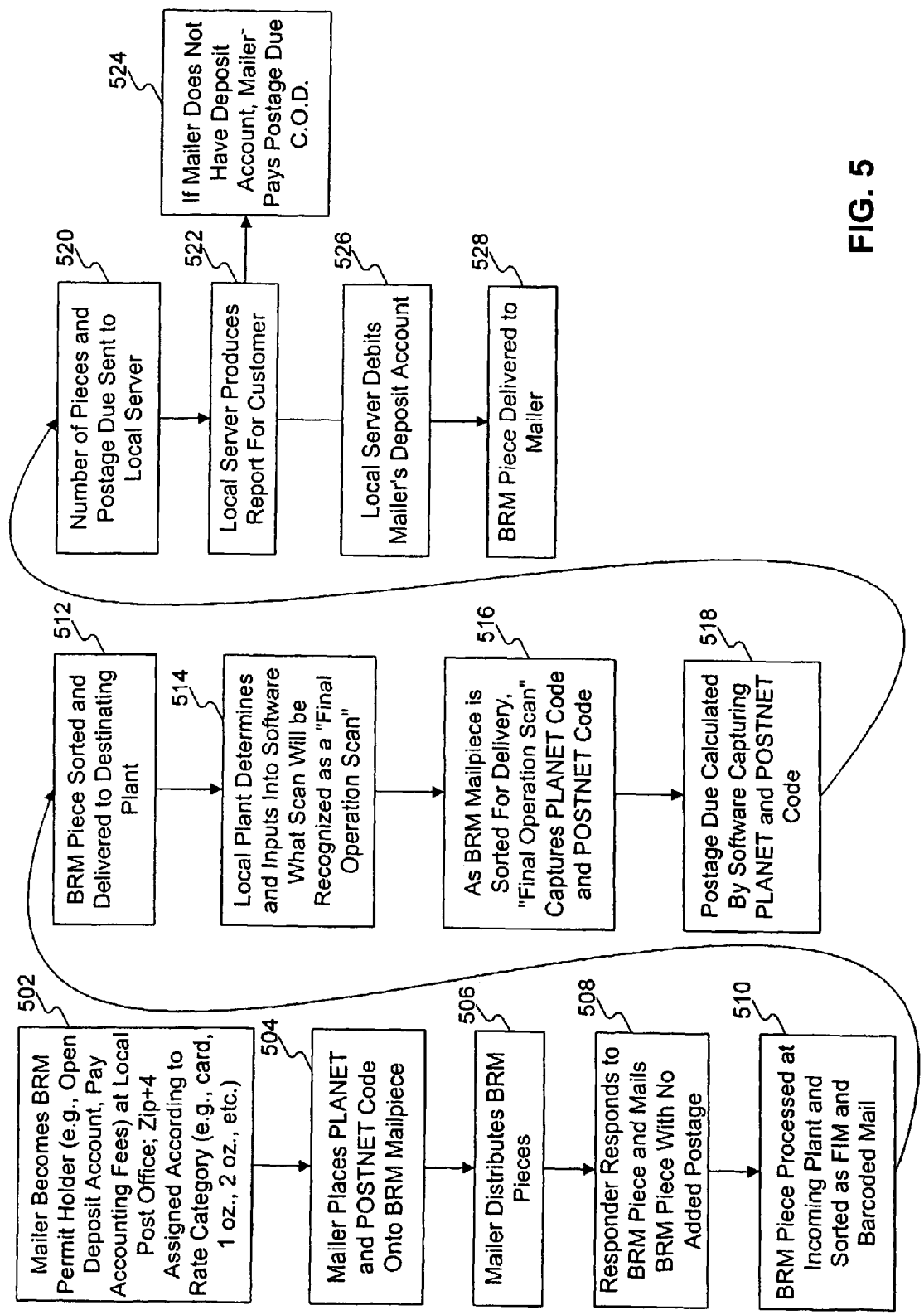
FIG. 5 is a flow chart of another exemplary scheme for transporting a document between a mailer and a responder in accordance with methods and systems consistent with the present invention.

FIG. 5 is a flow chart of another exemplary scheme for transporting a document between a mailer and a responder in accordance with methods and systems consistent with the present invention. First, the mailer 102 may obtain a BRM permit, for example, by going to a SP such as a Post Office, filling out an application, paying a permit fee, and paying an accounting fee (step 502). The mailer 102 may then create BRM mailpieces 106 by marking each mailpiece 106 with information that identifies the mailer 102 such as, for example, the mailer's POSTNET™ bar code which indicates where the mailpiece 106 should be delivered (step 504). The POSTNET™ bar code may also indicate the type of mailpiece 106 such as, for example, a postcard, a one-ounce envelope, or a two-ounce envelope. The mailpiece 106 may also be marked with a PLANET™ bar code that identifies the mailer 102. The mailer 102 may then distribute the mailpiece 106 as described above (step 506) and a responder 108 may return the mailpiece 106 by placing it in the mailstream without adding additional postage (step 508).

When the mailpiece 106 is processed by a SP, it may be sorted in accordance with the information identifying the mailer 102 (step 510). For example, the SP may automatically sort the mailpiece 106 as bar coded mail using a FIM such as the POSTNET™ bar code or the PLANET™ bar code. The mailpiece 106 may then be delivered to a destinating plant 110 (step 512). The mailpiece 106 may pass through many different machines that each scan the PLANET™ bar code as the mailpiece 106 is processed. Preferably, the system may avoid counting each mailpiece 106 for billing purposes multiple times by capturing only one scan of the PLANET™ code. For example, the destinating plant 110 may determine which scan of the PLANET™ bar code will be deemed the "final operation scan" (step 514), and when the mailpiece 106 is sorted for delivery, the final operation scan may capture the PLANET™ bar code and the POSTNET™ code (step 516). Then the billing software 304 may calculate the fee for delivering the mailpiece 106 (step 518). The number of mailpieces 106 and the calculated fee for each mailpiece 106 may be sent to the local server 204 (step 520) which generates a report for the mailer 102 (step 522). The mailer 102 may be billed, for example, using the local server 204 to debit the mailer's account (step 526) and the mailpieces 106 may be delivered to the mailer 102 (step 528). For another example, the mailpieces 106 may be provided to a SP who collects the fee for delivering the mailpieces 106 to the mailer 102 (step 524).

As described above, therefore, it will be apparent to those skilled in the art that various modifications and variations can be made in the apparatus and methods of the present invention without departing from the spirit and scope of the invention. Thus, it is intended that the present invention cover the modifications and variations of this invention, provided they come within the scope of the appended claims and their equivalents. In this context, equivalents mean each and every implementation for carrying out the functions recited in the claims, even if those particular functions are not explicitly described therein.

What is claimed is:

1. A method for automating an accounting process for business reply mail (BRM), comprising the steps of:
    assigning to a mailer a unique code identifying the mailer;
    receiving, from a responder, a BRM mailpiece without postage and including the unique code;
    delivering the BRM mailpiece to the mailer; and
    billing the mailer for a fee for transporting the BRM mailpiece from the responder to the mailer automatically through a computer-implemented process including automatically scanning the unique code with a bar code scanner, wherein the fee is automatically calculated based on the unique code and wherein the fee is calculated via the unique code based on a location of the mailer which is derived from the unique code.

2. The method of claim 1, wherein the billing step further comprises the substep of:
    deducting the fee from a deposit account corresponding to the mailer.

3. The method of claim 1, wherein the billing step further comprises the substep of:
    delivering a bill to the mailer when the BRM mailpiece is delivered to the mailer.

4. The method of claim 1, wherein the unique code is a bar code.

5. The method of claim 4, wherein the unique code is a PLANET bar code.

6. The method of claim 4, wherein the unique code is a POSTNET bar code.

7. The method of claim 1, wherein the computer-implemented process accesses information regarding fees for delivery of the mailpiece from a database storing accounting data that includes at least one of an account number for the identified mailer, a number of mailpieces processed for the mailer, and a fee corresponding to delivering the mailpieces.

8. The method of claim 1, wherein the computer-implemented process transmits a message to the mailer indicating that the responder has sent the mailpiece.

9. The method of claim 1, wherein the fee is further based on whether the mailer has paid an accounting fee associated with an anticipated volume of BRM mailpieces.

10. The method of claim 1, wherein the fee is further based on an identity of the mailer derived from the unique code.

11. The method of claim 1, wherein automatically calculating the fee occurs at a destinating plant that received the BRM mailpiece.

12. A system for automating an accounting process for business reply mail, comprising:
    means for enabling a mailer to mark a mailpiece with information identifying the mailer;
    means for receiving the mailpiece from a responder;
    means for identifying the mailer using the marked mailpiece;
    means for providing the marked mailpiece to a service provider for delivery; and
    means for billing the identified mailer a fee for transporting the mailpiece from the responder to the mailer automatically through a computer-implemented process including automatically scanning the information identifying the mailer with a bar code scanner, wherein the fee is automatically calculated based on the information identifying the mailer and wherein the fee is calculated via the information identifying the mailer based on a location of the mailer which is derived from the information identifying the mailer.

13. The system of claim 12, wherein said means for billing the identified mailer further comprises:
   means for deducting the amount fee from a deposit account corresponding to the identified mailer.

14. The system of claim 12, wherein said means for billing the identified mailer further comprises:
   means for providing a bill to a service provider for delivery to the identified mailer.

15. The system of claim 12, wherein said information identifying the mailer is a bar code.

16. The system of claim 15, wherein said information identifying the mailer is a PLANET bar code.

17. The system of claim 15, wherein said information identifying the mailer is a POSTNET bar code.

18. The system of claim 12, wherein the means for billing accesses information regarding fees for delivery of the mailpiece from a database storing accounting data that includes at least one of an account number for the identified mailer, a number of mailpieces processed for the mailer, and a fee corresponding to delivering the mailpieces.

19. The system of claim 12, further comprising:
   means for transmitting a message to the mailer indicating that the responder has sent the mailpiece.

20. The system of claim 12, wherein the fee is further based on whether the mailer has paid an accounting fee associated with an anticipated volume of BRM mailpieces.

21. The system of claim 12, wherein the fee is further based on an identity of the mailer derived from the unique code.

22. The system of claim 12, wherein automatically calculating the fee occurs at a destinating plant that received the BRM mailpiece.

23. A method for automated billing for delivery of a mailpiece, comprising:
   enabling a mailer to mark the mailpiece with information identifying the mailer;
   receiving the mailpiece from a responder;
   identifying the mailer using the marked mailpiece;
   providing the marked mailpiece to a service provider for delivery; and
   billing the identified mailer a fee for transporting the mailpiece from the responder to the mailer automatically through a computer-implemented process including automatically scanning information identifying the mailer with a bar code scanner, wherein the fee is automatically calculated based on the information identifying the mailer and wherein the fee is calculated via the information identifying the mailer based on a location of the mailer which is derived from the information identifying the mailer.

24. The method of claim 23, wherein said billing the identified mailer further comprises deducting the fee from a deposit account corresponding to the identified mailer.

25. The method of claim 23, wherein said billing the identified mailer further comprises providing a bill to a service provider for delivery to the identified mailer.

26. The method of claim 23, wherein said information identifying the mailer is a bar code.

27. The method of claim 26, wherein said information identifying the mailer is a PLANET bar code.

28. The method of claim 26, wherein said information identifying the mailer is a POSTNET bar code.

29. The method of claim 23, wherein the fee is further based on whether the mailer has paid an accounting fee associated with an anticipated volume of BRM mailpieces.

30. The method of claim 23, wherein the fee is further based on an identity of the mailer derived from the unique code.

31. The method of claim 23, wherein automatically calculating the fee occurs at a destinating plant that received the BRM mailpiece.

* * * * *